US00RE41550E

(19) United States
(12) Reissued Patent
Huehner

(10) Patent Number: US RE41,550 E
(45) Date of Reissued Patent: Aug. 24, 2010

(54) THEFT DETERRENT TAG

(75) Inventor: David K. Huehner, Nantucket, MA (US)

(73) Assignee: Checkpoint Systems, Inc., Thorofare, NJ (US)

(21) Appl. No.: 11/593,627

(22) Filed: Nov. 6, 2006

Related U.S. Patent Documents

Reissue of:
(64) Patent No.: 6,920,769
Issued: Jul. 26, 2005
Appl. No.: 10/780,952
Filed: Feb. 18, 2004

U.S. Applications:

(63) Continuation of application No. 10/154,735, filed on May 23, 2002, now abandoned.
(60) Provisional application No. 60/293,688, filed on May 25, 2001.

(51) Int. Cl.
*E05B 65/00* (2006.01)

(52) U.S. Cl. ..... 70/57.1; 206/1.5; 206/308.1; 206/387.11; 340/572.1

(58) Field of Classification Search ..... 70/57.1; 206/1.5, 308.1, 308.2, 387.11; 340/568.1, 340/572.1, 572.8, 572.9
See application file for complete search history.

(56) References Cited

U.S. PATENT DOCUMENTS

| | | | |
|---|---|---|---|
| 3,973,418 | A | 8/1976 | Close |
| 4,000,543 | A | 1/1977 | Paskert |
| 4,047,410 | A | 9/1977 | Close |
| 4,103,572 | A | 8/1978 | Humble et al. |
| 4,156,302 | A | 5/1979 | Van Niel |
| 4,603,453 | A | 8/1986 | Yokoyama |
| 4,685,234 | A | 8/1987 | Anderson et al. |
| 4,745,664 | A | 5/1988 | Damvig |
| 4,903,383 | A | 2/1990 | Gartshore |
| 5,031,756 | A | 7/1991 | Buzzard et al. |
| 5,140,836 | A | 8/1992 | Hogan et al. |
| 5,426,419 | A | 6/1995 | Nguyen et al. |
| 5,791,079 | A | 8/1998 | Mazzucchelli |
| 6,373,390 | B1 | 4/2002 | Hogan et al. |
| 6,474,117 | B2 | 11/2002 | Okuno |
| 6,535,130 | B2 | 3/2003 | Nguyen et al. |
| 2002/0024440 | A1 | 2/2002 | Okuno |
| 2002/0158762 | A1 | 10/2002 | Nguyen et al. |
| 2003/0222780 | A1 | 12/2003 | Sayegh et al. |

FOREIGN PATENT DOCUMENTS

| | | |
|---|---|---|
| DE | 200 14 860 | 10/2000 |
| EP | 0 947 650 | 10/1999 |

*Primary Examiner*—Suzanne D Barrett
(74) *Attorney, Agent, or Firm*—Sand & Sebolt

(57) ABSTRACT

A disposable theft deterrent tag includes first and second elements that lock together through a portion of an item of merchandise to secure the tag to the item of merchandise. The first portion of the tag includes a first locking member having opposed teeth that are adapted to lockingly engage a second locking member that is carried by the second element of the tag. The second locking member is in the form of a stepped post that snaps between the opposed teeth to lock the post to the teeth. The tag may be unlocked by moving the teeth with respect to the post. In one embodiment of the invention, a portion of the body of the first element may be destroyed while moving the teeth from the locked position to the unlocked position.

88 Claims, 8 Drawing Sheets

THEFT DETERRENT TAG

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of U.S. application Ser. No. 10/154,735 filed May 23, 2002, now abandoned, which claims priority from U.S. Provisional Patent Application Ser. No. 60/293,688, filed May 25, 2001; the disclosures of both are incorporated herein by reference.

BACKGROUND OF THE INVENTION

1. Technical Field

The present invention generally relates to anti-shoplifting devices and, more particularly, to a theft deterrent tag that may be secured to articles of merchandise in order to hold an EAS tag to the item of merchandise while the item of merchandise is displayed for sale. The theft deterrent tag is removed from the item of merchandise by the sales clerk at the time of purchase. Specifically, the present invention relates to a theft deterrent tag that has a stepped post that is adapted to pass through an item of merchandise to connect the tag to the item of merchandise. The stepped post is configured to lock between locking teeth until the locking members are moved from a locked position to an unlocked position.

2. Background Information

Various anti-theft mechanisms exist in the art for attaching electronic article surveillance (EAS) tags to items of merchandise so that the items of merchandise cannot be removed from a retail establishment without triggering an alarm. One type of relevant device uses a pin to pierce a portion of the item of merchandise to secure the tag to the item of merchandise. Users of these tags desire a tag that is easier to use and less expensive to purchase and apply to merchandise. The users of these tags also desire a theft deterrent tag that is disposable so that the merchant does not have to reattach the security tags after they are removed by the sales clerk.

BRIEF SUMMARY OF THE INVENTION

The invention provides a theft deterrent tag that includes first and second elements that lock together through a portion of an item of merchandise to secure the tag to the item of merchandise. The first portion of the tag includes a first locking member having opposed teeth that are adapted to lockingly engage a second locking member that is carried by the second element of the tag. The second locking member is in the form of a stepped post that snaps between the opposed teeth to lock the post to the teeth. The post is configured to be passed through a wide variety of different items of merchandise.

The invention also provides a theft deterrent tag that is disposable. The tag may be moved from the locked position to the unlocked position by moving the teeth with respect to the post. A portion of the body of the first element may be destroyed while moving the teeth from the locked to the unlocked position.

The invention further provides an opener for the tag wherein the opening includes a prong that engages the first locking member of the tag to move the first locking member from the locked position to the unlocked position. In one embodiment, the invention fixes the position of the prong with respect to a plunger that holds the tag. The plunger is used to drive the tag down over the prong to unlock the tag from the merchandise.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
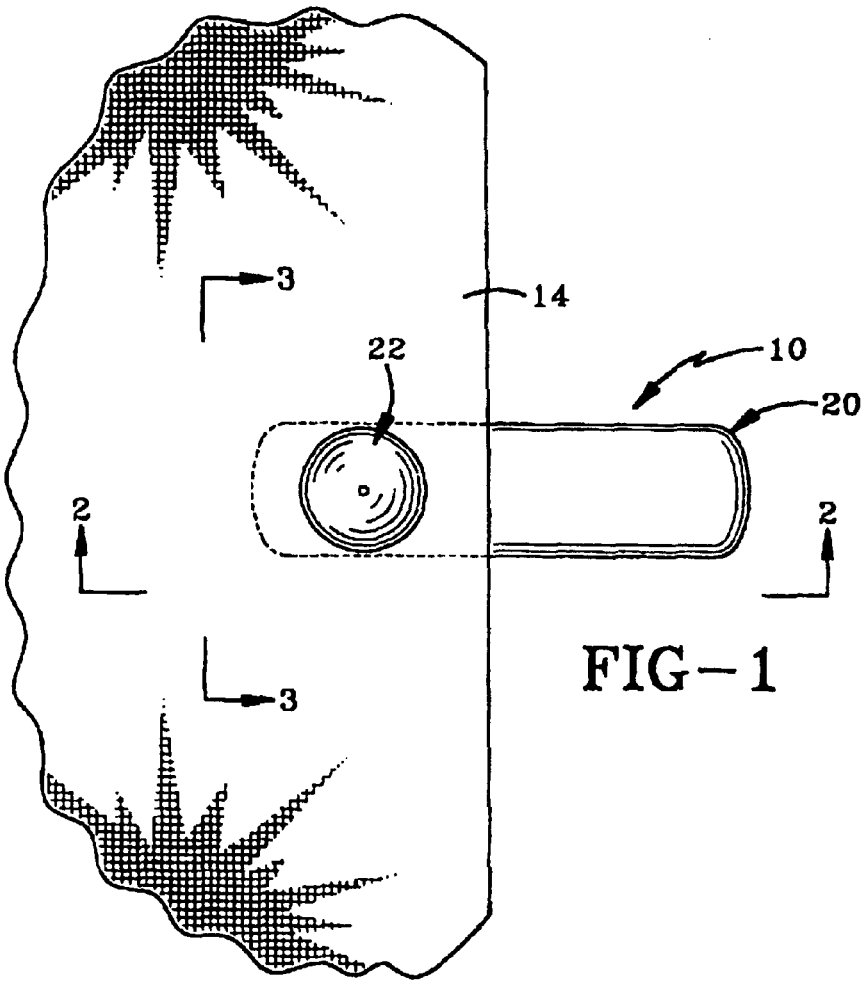
FIG. 1 is a top plan view of the theft deterrent tag of the present invention connected to a portion of an item of merchandise.
Figure 2:
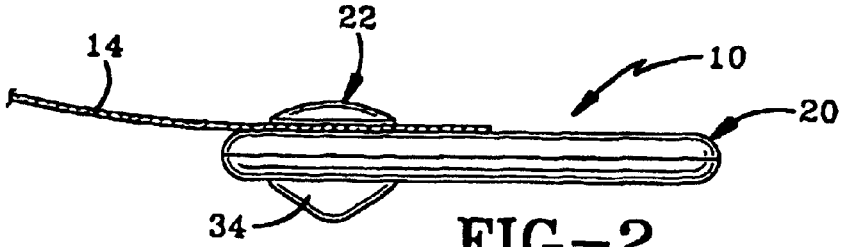
FIG. 2 is a section view taken along line 2—2 of FIG. 1.
Figure 3:
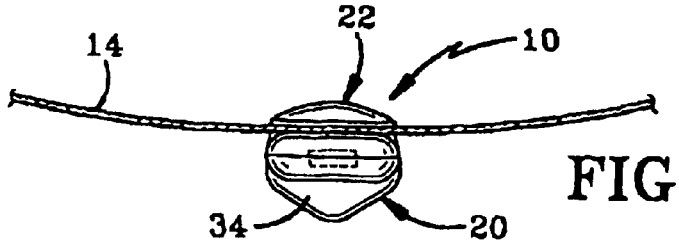
FIG. 3 is a section view taken along line 3—3 of FIG. 1.

The theft deterrent tag of the present invention is indicated generally by the numeral 10 in the accompanying drawings. Tag 10 is adapted to hold an electronic article surveillance (EAS) tag 12 (FIG. 5) in a secure manner to an item of merchandise 14 so that item of merchandise 14 cannot be removed from a retail establishment without triggering an alarm. Tag 10 thus frustrates shoplifting attempts. Tag 10 generally includes a first element 20 and a second element 22 that snap together in a locked position through a portion of item of merchandise 14 to secure tag 10 to merchandise 14.

First tag element 20 includes a body 24 that defines at least a first chamber 26 configured to house EAS tag 12.

First tag element 20 includes opposed ribs 28 and 30 that cooperate together to hold a first locking member 32 in body 24. Body 24 is typically formed in two halves that are snapped together over first locking member 32 so that first locking member 32 is clamped between ribs 28 and 30. In other embodiments of the invention, body 24 may be integrally molded, glued together, or assembled in other manners known to those skilled in the art.

Body 24 also includes a hood 34 that provides an interior chamber to receive the extending portion of a second locking member 36 that protrudes through a portion of first locking member 32 when tag 10 is in the locked position. Body 24 may have smooth outer edges so that it does not snag on items of merchandise with which it is used.

Figure 5:
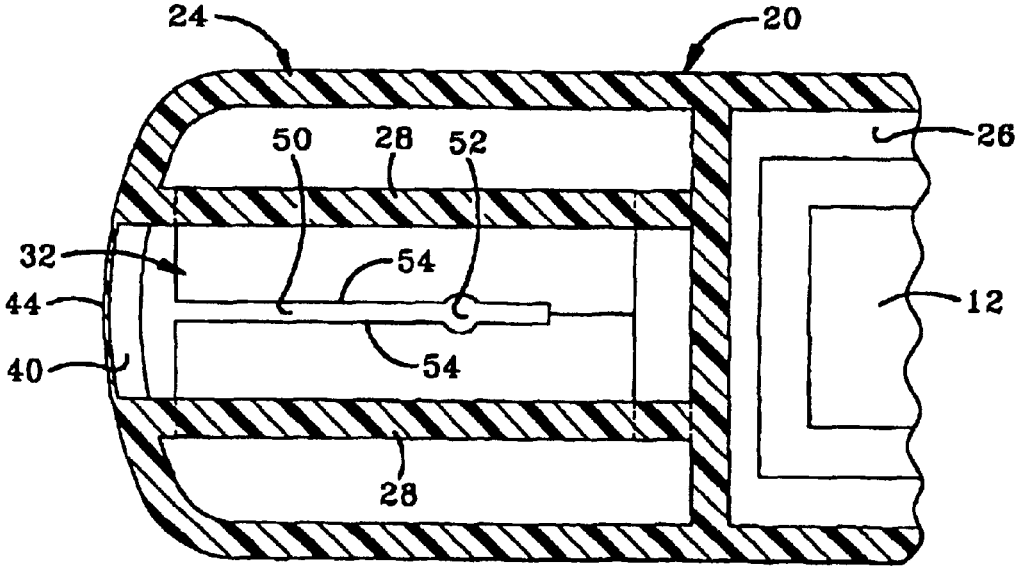
FIG. 5 is a section view taken along line 5—5 of FIG. 4.
Figure 6:
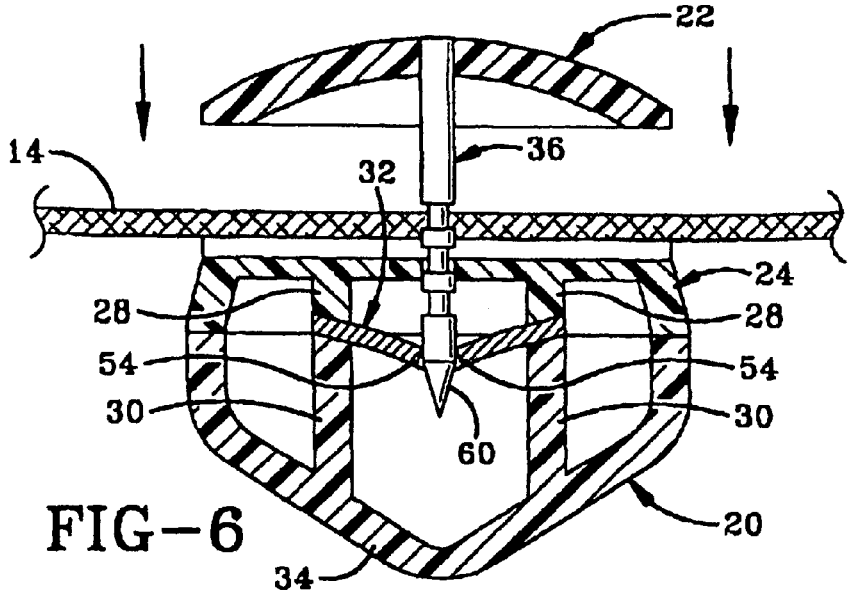
FIG. 6 is a view similar to FIG. 4 showing the second element of the tag being pushed through the merchandise and into the first element of the tag.

Body 24 defines an opening 40 aligned with first locking member 32 so that a key prong 42 (FIGS. 14 and 17) may enter first element 20 and move first locking member 32 from the locked to the unlocked position. Opening 40 may be covered by a seal 44 that prevents the user of tag 10 and a potential shoplifter from viewing first locking member 32. Seal 44 is broken by prong 42 when tag 10 is unlocked as depicted in FIGS. 14–18. Seal 44 may be integrally molded with body 24. As depicted in FIG. 5, seal 44 has a thickness that is substantially less than the thickness of the other walls of body 24.

Figure 7:
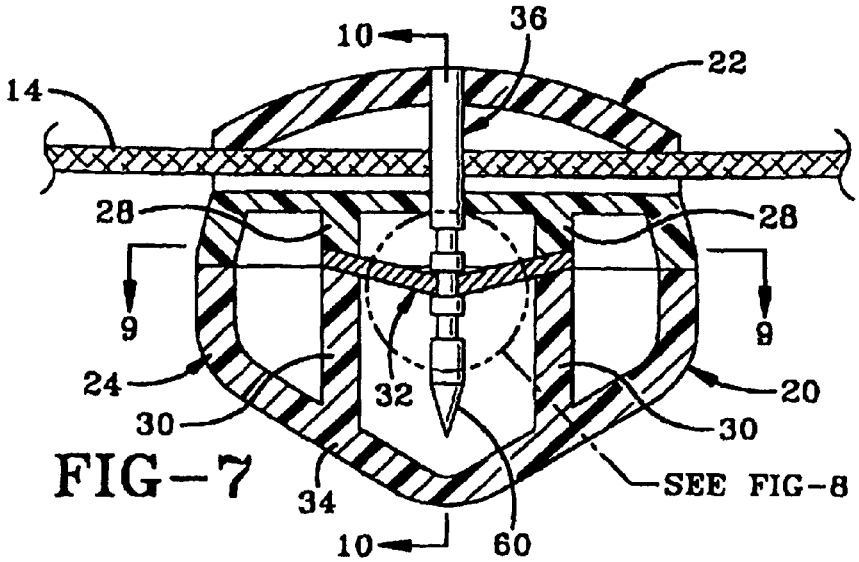
FIG. 7 is a view similar to FIG. 6 showing the tag locked onto an item of merchandise.
Figure 8:
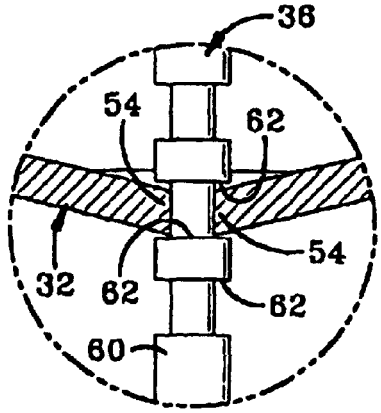
FIG. 8 is an enlarged view of the encircled portion of FIG. 7.
Figure 9:
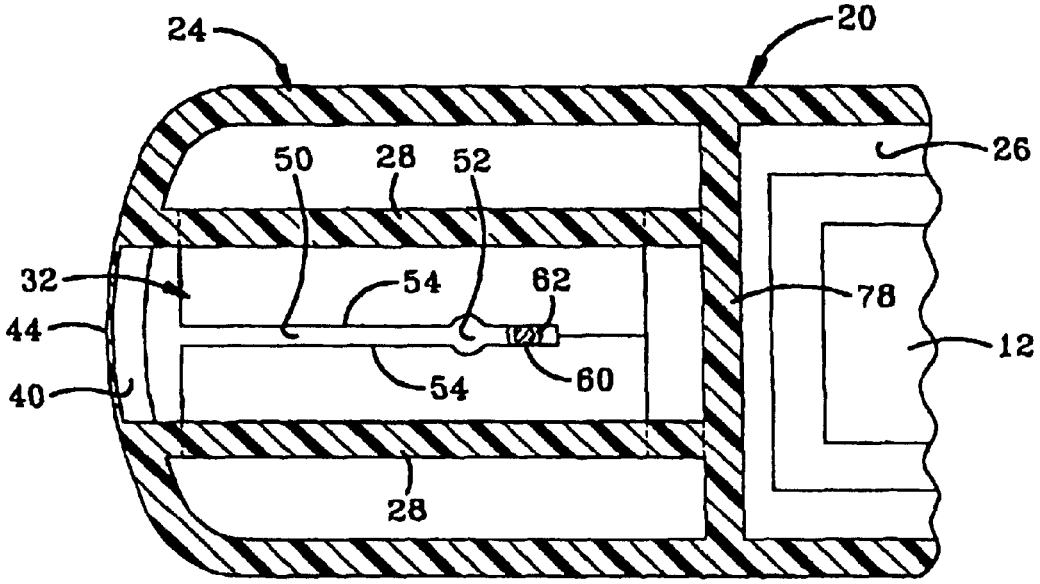
FIG. 9 is a section view taken along line 9—9 of FIG. 7.
Figure 10:
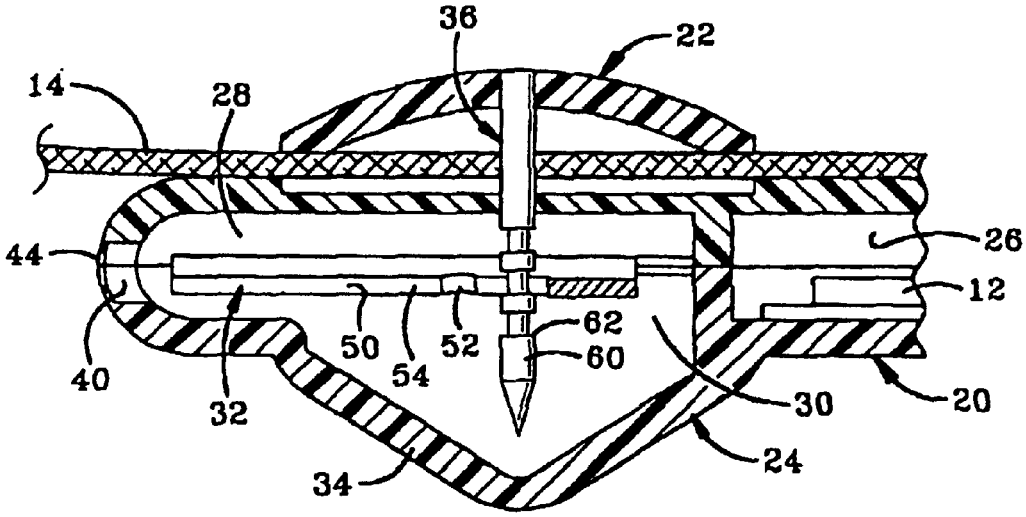
FIG. 10 is a section view taken along line 10—10 of FIG. 7.

First locking member 32 includes an elongated slot 50 and an opening 52 as depicted in FIG. 9. Locking member 32 includes opposed teeth 54 that define of slot 50. Teeth 54 engage second locking member 36 to prevent second locking member 36 from being removed from first element 20 when second element 22 is moved from the unlocked to the locked position. Second locking member 36 may be in the form of a post 60 having a plurality of steps 62 designed to interact with teeth 54 to lock post 60 with respect to first locking member 32. The outer diameter of post 60 is thus greater than the space between teeth 54 as shown in FIGS. 7 and 9. The end of post 60 may be pointed to help it move through slot 50.

Figure 4:
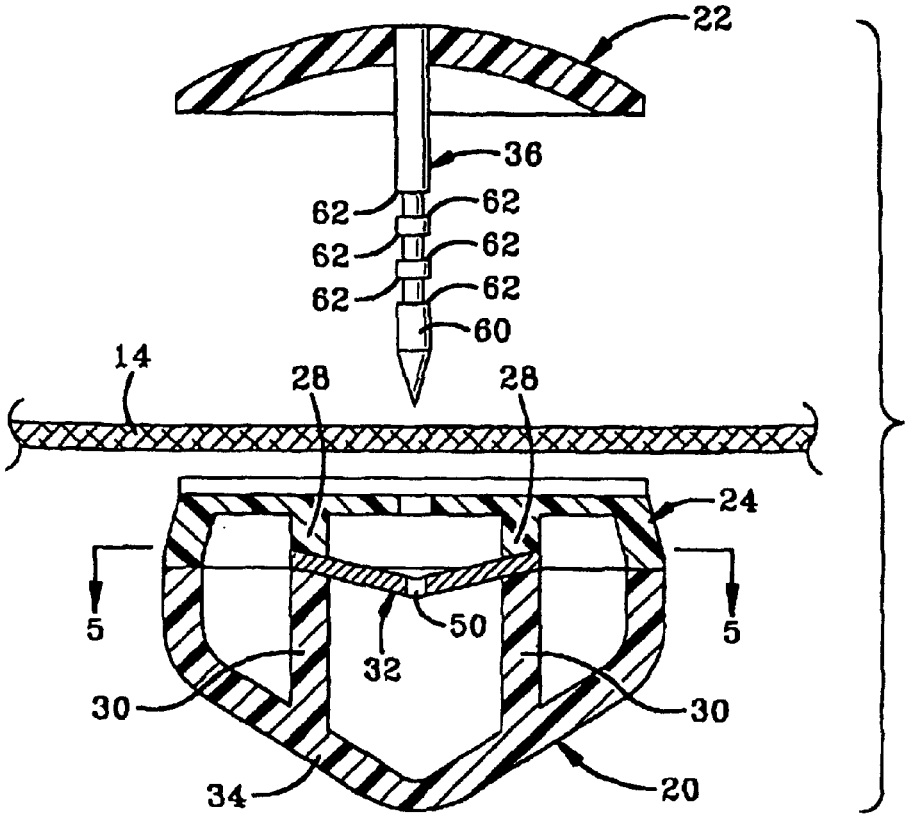
FIG. 4 is an exploded section view of the theft deterrent tag in an unlocked and disassembled position with respect to a portion of an item of merchandise.

First locking member 32 may be angled into a "V" shape as depicted in FIG. 4 to increase the strength of the connection between first locking member 32 and second locking member 36. The point of the "V" is pointed away from the removal direction to make it hard to pull post 60 out of member 32.

Tag 10 is locked by placing a portion of merchandise 14 between second locking member 36 and first locking member 32. Post 60 of second locking member 36 is then pushed down through merchandise 14 through first element 20 until it engages first locking member 32. Step 62 of post 60 snaps through teeth 54 until the body of second element 22 clamps merchandise 14 between itself and first element 20. Tag 10 thus cannot be removed from merchandise 14 until first locking member 32 is moved to the unlocked position.

Figure 12:
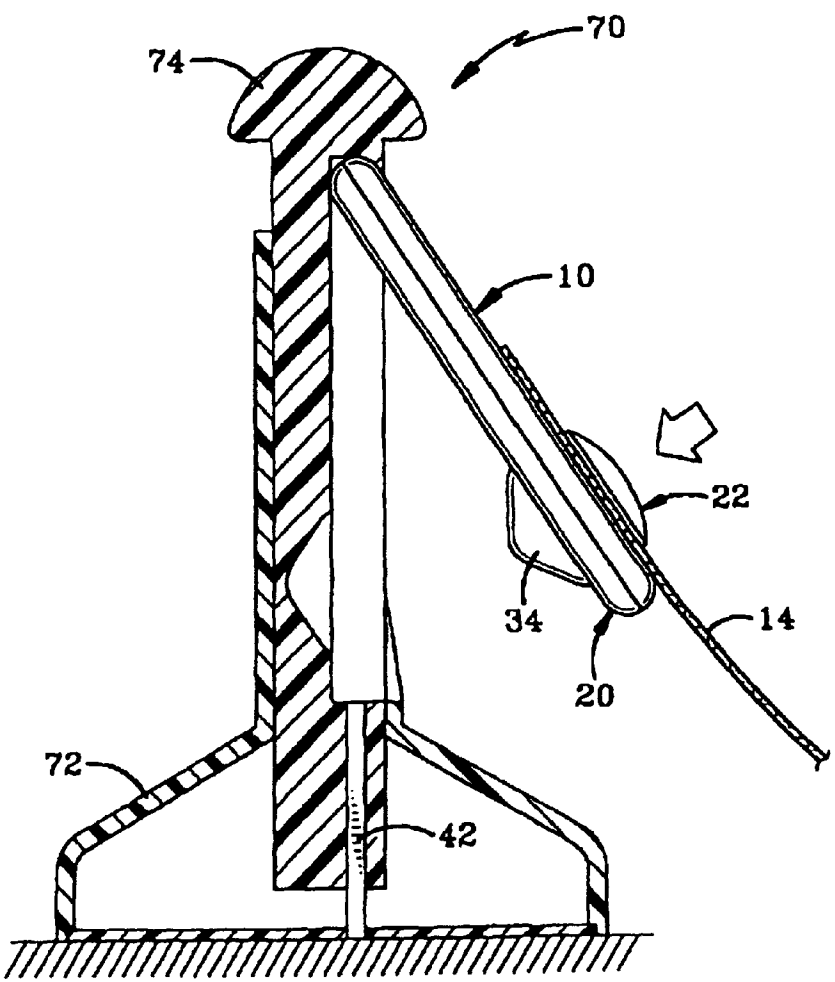
FIG. 12 is a section view taken along line 12—12 of FIG. 11 with the tag having the item of merchandise being inserted into the opener.
Figure 11:
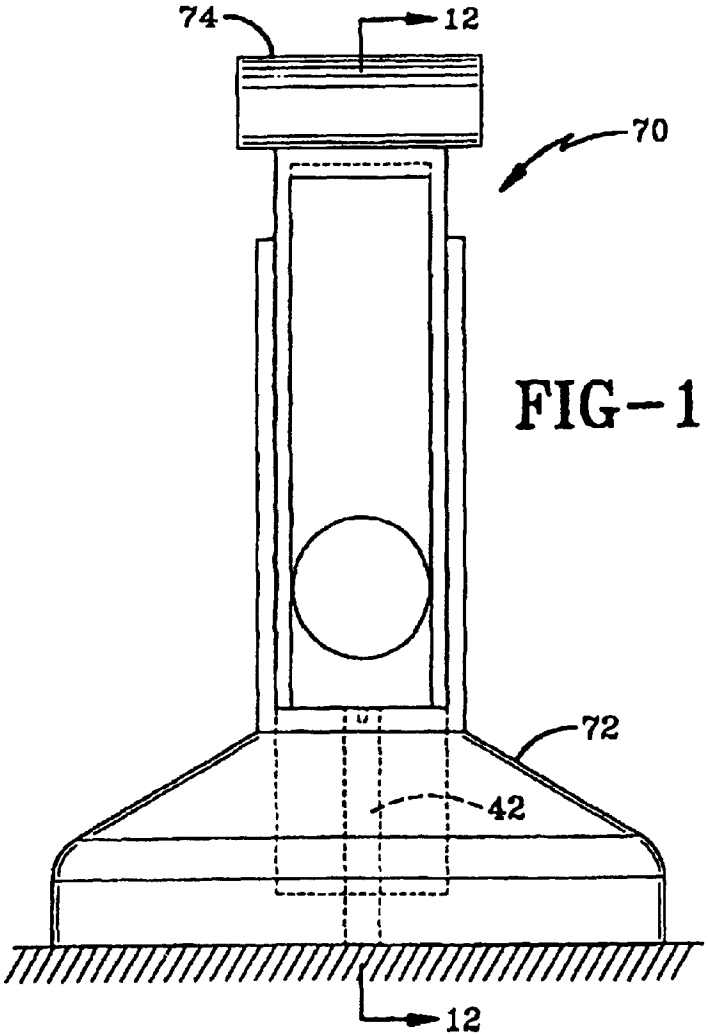
FIG. 11 is a front elevation view of an opener for unlocking the tag.
Figure 16:
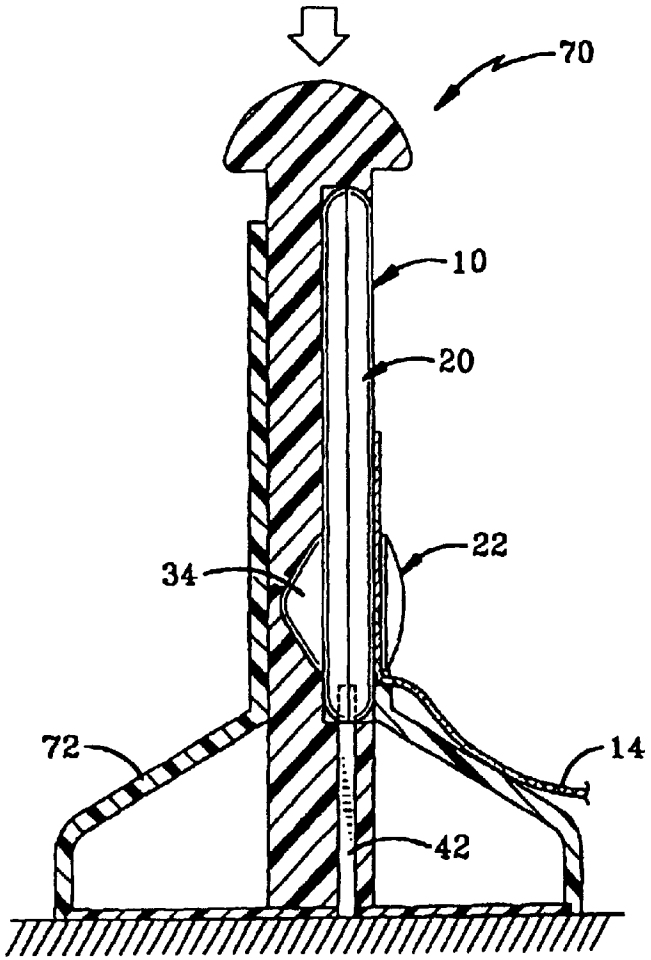
FIG. 16 is a view similar to FIG. 13 showing the plunger of the opener being depressed.
Figure 13:
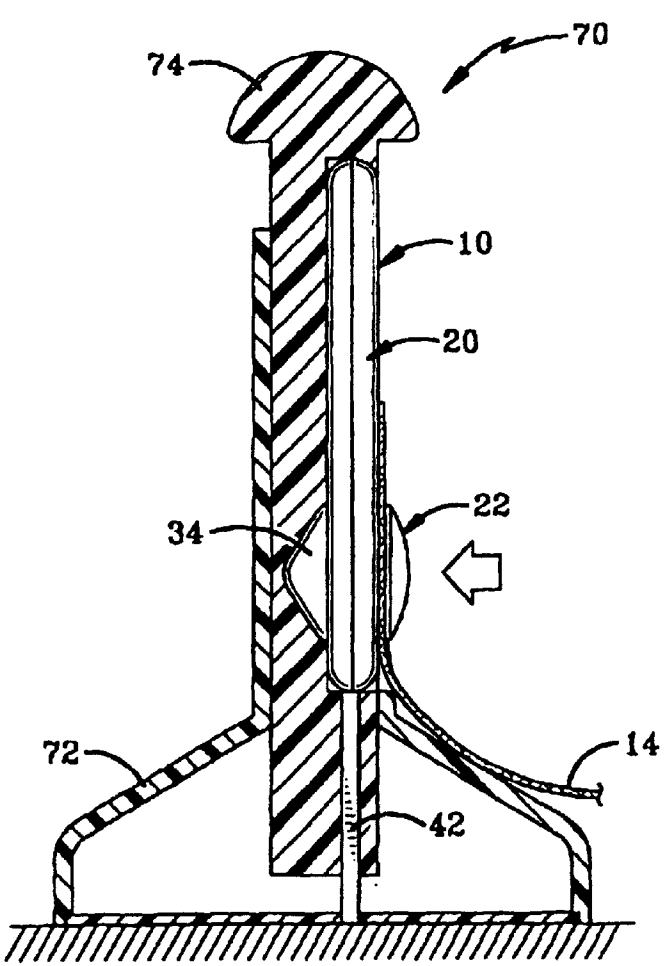
FIG. 13 is a section view similar to FIG. 12 showing the tag and item of merchandise inserted into the opener ready to be unlocked.
Figure 17:
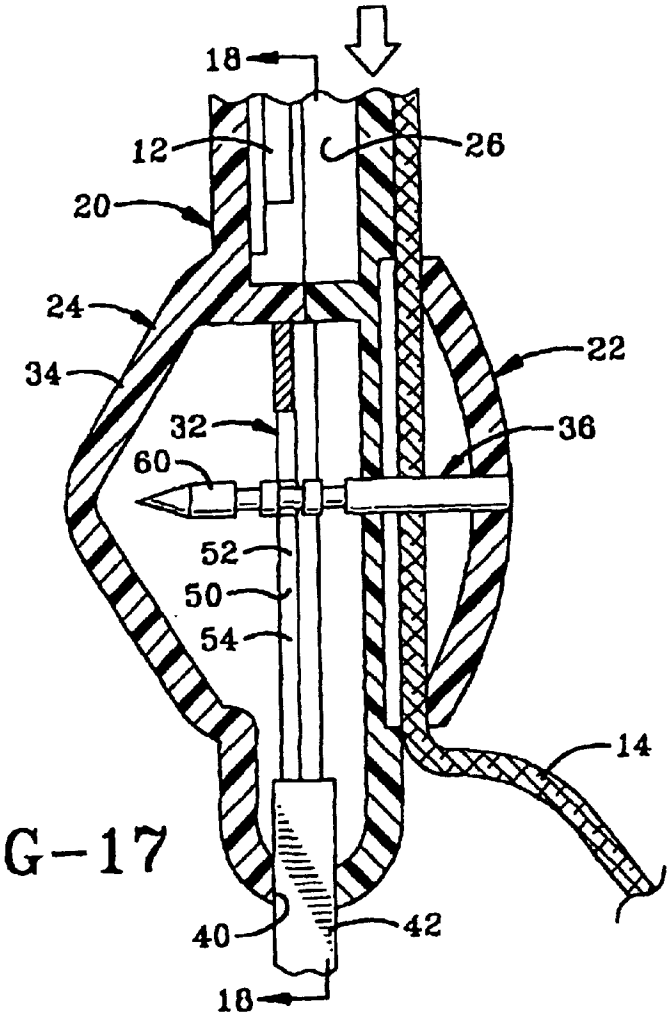
FIG. 17 is a view similar to FIG. 14 showing the tag while the plunger of the opener is depressed.
Figure 14:
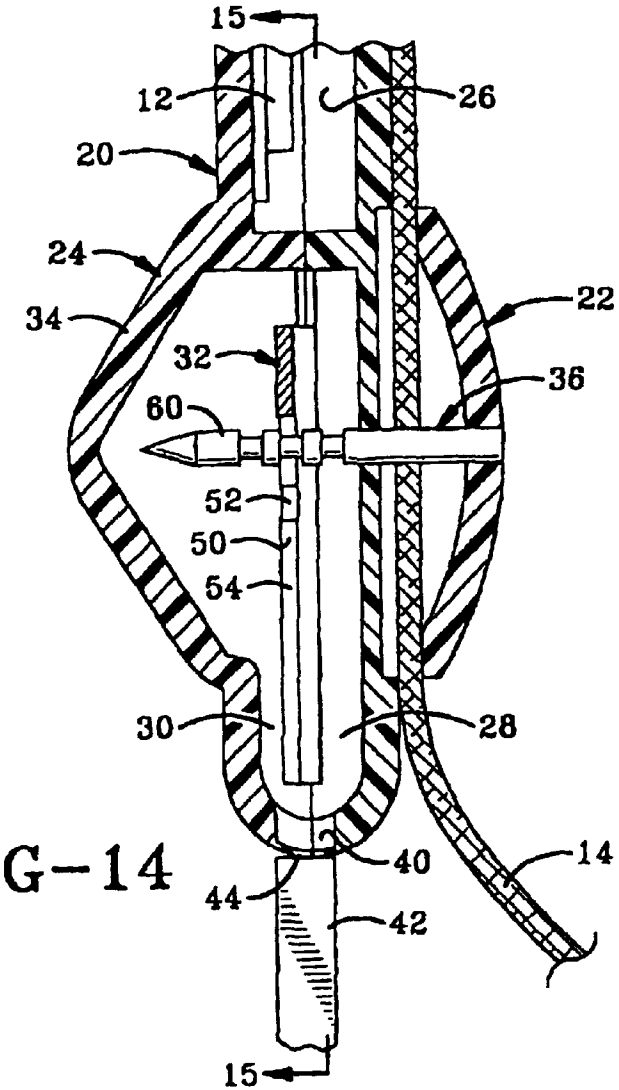
FIG. 14 is an enlarged section view of the front portion of the tag before the plunger of the opener is depressed.
Figures 15, 18, 19:
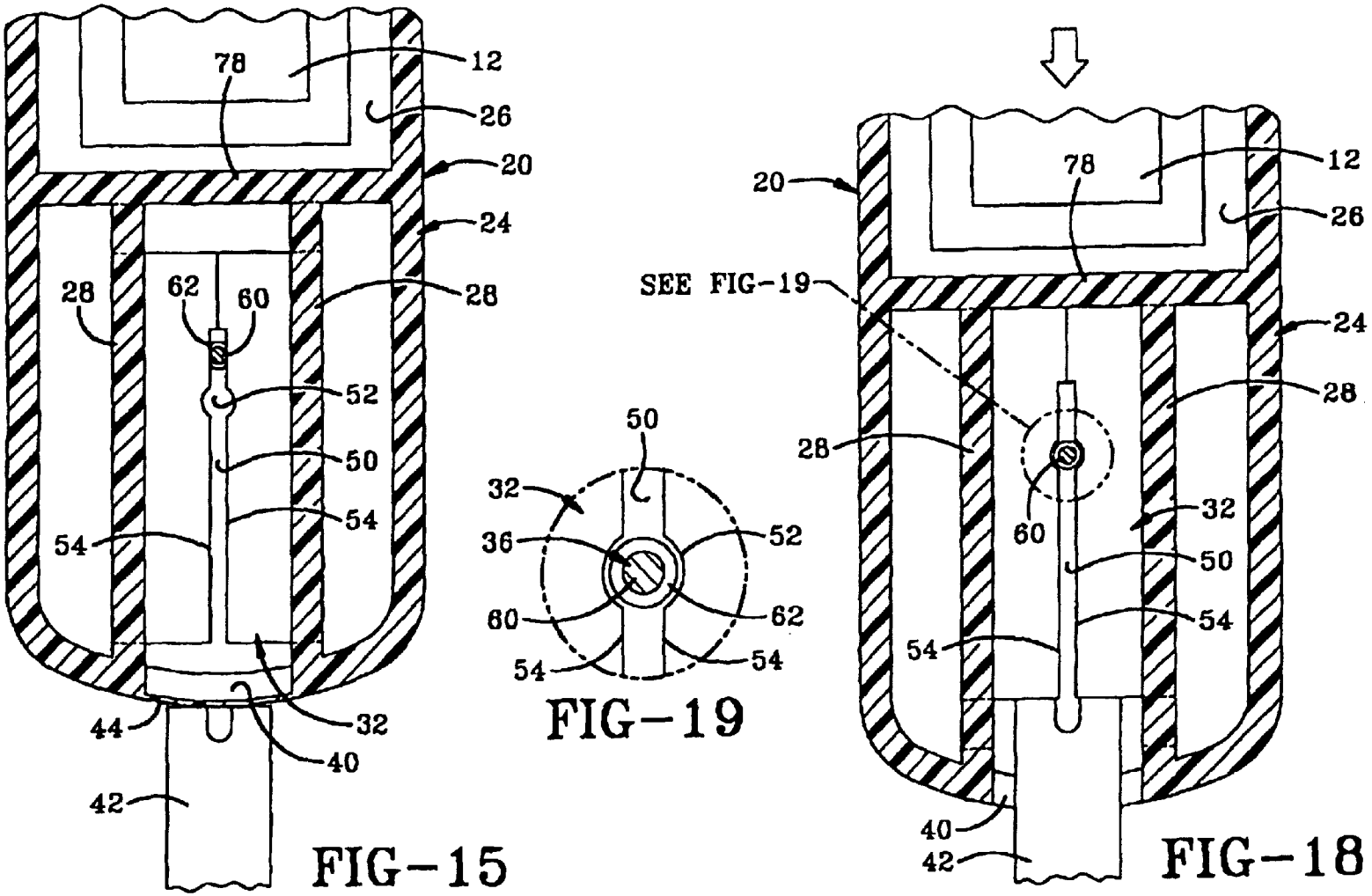
FIG. 15 is a section view taken along line 15—15 of FIG. 14.
FIG. 18 is a section view taken along line 18—18 of FIG. 17.
FIG. 19 is an enlarged view of the encircled portion of FIG. 18.

The user moves first locking member 32 to the unlocked position by sliding first locking member 32 from the locked position depicted in FIGS. 9 and 14 to the unlocked position depicted in FIG. 17. One way of achieving this movement is to place tag 10 in an opener 70 that includes a base 72 and a plunger 74. Plunger 74 is movable with respect to base 72. Base 72 supports prong 42 in a fixed position with respect to plunger 74. Tag 10 may be placed into plunger 74 as depicted in FIGS. 12 and 13. The user then depresses plunger 74 as depicted in FIGS. 16–19 so that post 60 will be aligned with opening 52. Body 24 includes a stop wall 78 that abuts against locking member 32 when opening 50 is aligned with post 60. Plunger 74 is also configured to only depress tag 10 a distance sufficient to move locking member 32 so that opening 52 aligns with post 60. After plunger 74 has been depressed, the user may remove element 22 and merchandise 14 from element 20 and dispose of tag 10.

In another embodiment, a hand held opener may be used. In another embodiment, the user may strike the tag on a counter to drive a member against locking member 32.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A theft deterrent tag adapted to be locked to an item of merchandise; the theft deterrent tag comprising:

a first tag element carrying a one-piece first locking member;

a second tag element carrying a second locking member;

the second tag element being lockable to the first tag element by engaging the second locking member with the first locking member;

the first locking member being linearly slidable from [the locked] *a locked* position to an unlocked position to allow the second locking member to be released; and the first locking member being free of a camming engagement with the first tag element for moving the first locking member from the unlocked position to the locked position.

2. The tag of claim 1, wherein the first tag element includes a body that defines an opening that is aligned with the first locking member; the first tag element further including a seal that covers the opening; the seal being adapted to be punctured.

3. The tag of claim 2, wherein the body has at least one body wall that has a first thickness; the seal having a second thickness; the first thickness being larger than the second thickness.

4. The tag of claim 1, wherein the first tag member includes a hood that surrounds a portion of the second locking member when the [second] *first* locking member is in the locked position.

5. The tag of claim 4, wherein the hood has an outer surface; the outer surface being smooth.

6. The tag of claim 1, further comprising an EAS tag carried by the first tag element.

7. The tag of claim 6, wherein the first tag element defines a chamber; the EAS tag being carried by the first tag element within the chamber.

8. The tag of claim 7, wherein the first tag element includes first and second halves that snap together to define the chamber.

9. The tag of claim 1, wherein the first locking member is slidably carried between opposed ribs carried by the first tag element.

10. The tag of claim 9, wherein the first locking member includes first and second halves that clamp together on the first locking member.

11. The tag of claim 10, wherein each of the first and second halves of the first tag element includes ribs that engage the first locking member.

12. The tag of claim 1, wherein the first locking member includes opposed teeth that define a slot; the second locking member including a portion that is disposed in the slot between the teeth when the [second] *first* locking member is in the locked position.

13. The tag of claim 12, wherein the first locking member defines an opening that is connected to the slot; the second locking member being disposed in the opening when the first locking member is in the unlocked position.

14. The tag of claim 13, wherein the second locking member includes a post having at least one step; the opposed teeth of the first locking member engaging the step when the first [and second locking members are] *locking member is* in the locked position.

15. The tag of claim 14, wherein the post and the step have maximum widths; the size of the opening being larger than the maximum widths of the post and step.

16. The tag of claim 13, wherein the first locking member has a V-shaped cross section.

17. The tag of claim 16, wherein the slot is disposed at the bottom of the V-shaped cross section.

18. The tag of claim 17, wherein the second locking member has a pointed leading end.

19. The tag of claim 1 wherein the second tag element is removable from the first tag element without flexing of the first locking member.

20. The tag of claim 1 wherein the first locking member is slidable from the locked position to the unlocked position without flexing of the first locking member.

21. The tag of claim 20 wherein the second locking member is disengageable from the first locking member without flexing of the first locking member.

22. The tag of claim 1, wherein the first locking member includes opposed teeth that define a slot; a portion of the first locking member extending between and being rigidly mounted on the teeth; the portion being rigid; the second locking member including a portion that is disposed in the slot between the teeth when the [second] *first* locking member is in the locked position.

23. The tag of claim 22 wherein the first locking member defines an opening which communicates with the slot; the second locking member being disposed in the opening when the first locking member is in the unlocked position; and wherein the slot has a closed end adjacent the opening, the closed end being formed by the portion of the first locking member rigidly mounted on the teeth.

24. The tag of claim 1 wherein the first locking member includes opposed teeth that define a slot having parallel sides along the entire length of the slot; the second locking member including a portion that is disposed in the slot when the [second] *first* locking member is in the locked position.

25. The tag of claim 24 wherein the first locking member defines an opening that communicates with the slot; the second locking member being disposed in the opening when the first locking member is in the unlocked position.

26. The tag of claim 24 wherein the first locking member defines an opening that communicates with the slot; a portion of the second locking member passes through the opening to remove the second tag element from the first tag element, said portion having a maximum width; and the opening is larger than the maximum width.

27. The tag of claim 1, wherein the first locking member includes opposed teeth that define a slot; the first locking member sliding from the locked position to the unlocked position without changing the spacing between the teeth.

28. The tag of claim 1, wherein the second tag element is in the form of a tack having a head and a post with the post functioning as the second locking member.

29. A theft deterrent tag adapted to be locked to an item of merchandise; the theft deterrent tag comprising:

a first tag element carrying a first locking member;

a second tag element carrying a second locking member having a longitudinal axis and a cross sectional dimension;

the second tag element being lockable to the first tag element by engaging the second locking member with the first locking member;

the first locking member including opposed teeth that define a slot; the second locking member including a portion that is disposed in the slot between the teeth when the first and second locking members are in a locked position;

the first locking member defining an opening sized larger than the cross sectional dimension of the second locking member;

the first locking member being movable from the locked position to an unlocked position where the second locking member is disposed in the opening of the first locking member to allow the second locking member to be released from the first locking member; and the second locking member being removable from the first locking member without [flexing] *spreading* the opposed teeth away from each other.

30. The tag of claim 29, wherein the first locking member has a V-shaped cross section; the slot being disposed at the bottom of the V-shaped cross section.

31. The tag of claim 30, wherein the second locking member includes a stepped post that is disposed in the slot of the first locking member when the second locking member is in the locked position.

32. The tag of claim 29 wherein the first locking member is slidable from the locked position to the unlocked position without flexing of the first locking member.

33. The tag of claim 29 wherein a portion of the first locking member extends between and is rigidly mounted on the teeth, said portion being rigid.

34. The tag of claim 29, wherein the first tag element carries an EAS tag.

35. The tag of claim 34, wherein the first tag element defines at least a pair of ribs; the first locking member engaging the at least a pair of ribs.

36. The tag of claim 29, wherein the first locking member moves in a direction substantially perpendicular to the longitudinal axis of the second locking member when the first locking member moves from the locked position to the unlocked position.

37. The tag of claim 1 wherein the first locking member is free of a camming engagement affecting movement of the first locking member between the locked and unlocked positions.

38. The tag of claim 1 wherein the tag is free of a spring element for biasing the first locking member in the locked position.

39. The tag of claim 1 wherein the tag is free of a spring element for moving the first locking member.

40. The tag of claim 1 wherein the first locking member is movable only in a single linear direction from the locked position to an unlocked position wherein the second locking member is removable from the first locking member.

41. The tag of claim 1 wherein the second locking member has an axis along which the second locking member is movable during connection and disconnection of the first and second tag elements; and wherein the first locking member is linearly slidable only in a direction which is perpendicular to the axis.

42. The tag of claim 1 wherein a key prong is insertable into the tag to move the first locking member to unlock the first tag element from the second tag element; and wherein the first locking member remains in the unlocked position after removal of the key prong from the tag.

43. The tag of claim 27 wherein when the first locking member is in the locked position a portion of the second locking member is disposed in the slot between the teeth and the removal of the portion from the first locking member is prevented by engagement of the portion by each of the opposed teeth of the first locking member.

44. The tag of claim 29 wherein first locking member is a one-piece member.

45. The tag of claim 1 wherein the first locking member flexes to lock the first and second locking members together; and wherein the second locking member is removable from the first locking member without flexing the first locking member.

46. The tag of claim 45 wherein the first locking member includes opposed teeth defining a slot there between; and wherein the second locking member includes a portion which when inserted in the slot causes the flexing of the first locking member to lock the first and second locking members together, said flexing including movement of the opposed teeth away from one another.

47. The tag of claim 46 wherein the first locking member is movable from [a locked] *the locked* position to [an unlocked] *the unlocked* position wherein the second locking member is disposed in an opening to allow the second locking member to be removed from the first locking member.

48. The tag of claim 47 wherein the first locking member defines the opening; and wherein the opening is in communication with the slot.

49. The tag of claim 46 wherein said flexing includes movement of the teeth toward one another.

50. A theft deterrent tag adapted to be locked to an item of merchandise; the theft deterrent tag comprising;

a first tag element carrying an EAS tag and a one-piece first locking member having opposed teeth;

a second tag element in the form of a tack having a post extending from a head; the post functioning as a second locking member;

the post being configured to pass through an item of merchandise and into the first tag element to engage the first locking member;

the second tag element being lockable to the first tag element by locking the first locking member to the post of the second tag element so that when the first locking member is in a locked position removal of the post from the first locking member is prevented by engagement of the post by each of the opposed teeth of the first locking member;

the first locking member being movable between *the* locked position and an unlocked position; the first locking [element] *member* being non-pivotably and non-flexingly moveable from the locked position to [an] *the* unlocked position; and the post being removable from the first locking member when the first locking member is in the unlocked position.

51. The tag of claim 50, wherein the first locking member slides from the locked position to the unlocked position.

52. The tag of claim 51, wherein the post has a longitudinal axis; the first locking member sliding perpendicular to the longitudinal axis of the post when the first locking member moves from the locked position to the unlocked position.

53. The tag of claim 50, wherein the teeth are disengaged from the post when the first locking member is in the unlocked position.

54. The tag of claim 50, wherein the opposed teeth define a slot; and wherein the post is disposed in the slot between the teeth when the first locking member is in the locked position.

55. The tag of claim 54, wherein the slot of the first locking member defines an opening; the opening being sized larger than the post; the post being disposed in the opening when the first locking member is in the unlocked position.

56. The tag of claim 55, wherein the first locking member has a V-shaped cross section; the slot being defined at the bottom of the V-shaped cross section.

57. The tag of claim 56, wherein the post has at least one step; the opposed teeth of the first locking member engaging the step when the first and second locking members are in the locked position.

58. The tag of claim 50 wherein the second tag element is removable from the first tag element without flexing the first locking member.

59. A theft deterrent tag adapted to be locked to an item of merchandise; the theft deterrent tag comprising:

a first tag element carrying a first locking member; a second tag element carrying a second locking member;

the second locking member being in the form of a post adapted to pass through a portion of the item of merchandise and into the first tag element to engage the first locking member;

the second tag element being lockable to the first tag element;

the first locking member being linearly slidable from a locked position to an unlocked position;

the unlocked position allowing the second locking member to be disengaged from the first locking member;

the first tag element including opposed ribs that are elongated and spaced from one another to define a portion of an opening sized to receive a key prong that moves the first locking member from the locked position to the unlocked position;

the key prong directly engaging the first locking [members] *member* without engaging the ribs of the first tag element when the key prong is moving the first locking member from the locked position to the unlocked position; and the first locking member being slidably mounted on the opposed ribs of the first tag element.

60. The tag of claim 59, wherein the first tag element includes first and second halves that are joined together about their perimeters.

61. The tag of claim 60, wherein the first and second halves cooperate together to define the opening adapted to receive the key prong.

62. The tag of claim 59 wherein the first locking member has opposed edges; and wherein the first locking member slidably engages the opposed ribs respectively adjacent the opposed edges.

63. A theft deterrent tag adapted to be locked to an item of merchandise; the theft deterrent tag comprising:

a first tag element carrying a first locking member; a second tag element carrying a second locking member;

the second locking member being in the form of a post adapted to pass through a portion of the item of merchandise and into the first tag element to engage the first locking member;

the second tag element being lockable to the first tag element;

the first locking member being linearly slidable from a locked position to an unlocked position;

the unlocked position allowing the second locking member to be disengaged from the first locking member;

the first tag element including opposed ribs that are elongated and spaced from one another to define a portion of an opening sized to receive a key prong that moves the first locking member from the locked position to the unlocked position;

the key prong directly engaging the first locking member without engaging the ribs of the first tag element when the key prong is moving the first locking member from the locked position to the unlocked position; and the first locking member defining an elongated slot in which the post is disposed in the locked position; and wherein the [elongate] *elongated* ribs of the first tag element are elongated in the elongated direction of the slot.

64. A theft deterrent tag adapted to be locked to an item of merchandise; the theft deterrent tag comprising:

a first tag element carrying a first locking member; a second tag element carrying a second locking member;

the second locking member being in the form of a post adapted to pass through a portion of the item of merchandise and into the first tag element to engage the first locking member;

the second tag element being lockable to the first tag element;

the first locking member being linearly slidable from a locked position to an unlocked position;

the unlocked position allowing the second locking member to be disengaged from the first locking member;

the first tag element including opposed ribs that are elongated and spaced from one another to define a portion of an opening sized to receive a key prong that moves the first locking member from the locked position to the unlocked position;

the key prong directly engaging the first locking member without engaging the ribs of the first tag element when the key prong is moving the first locking member from the locked position to the unlocked position; and the first locking member defining an elongated slot in which the post is disposed in the locked position; and wherein the key prong moves in the elongated direction of the slot to move the first locking member from the locked position to the unlocked position.

65. A theft deterrent tag adapted to be locked to an item of merchandise, the theft deterrent tag comprising:

a first tag element carrying a one-piece first locking member;

a second tag element carrying a second locking member having an axis along which the second locking member is movable during connection and disconnection of the first and second tag elements;

the second tag element being lockable to the first tag element by engaging the second locking member with the first locking member in a locked position;

the first locking member being linearly movable only in a direction which is perpendicular to the axis from the locked position to an unlocked position to allow the second locking member to be released.

66. The tag of claim 65 wherein the second locking member comprises a post elongated in the direction of the axis; and wherein the second tag element is lockable to the first tag element by engaging the post with the first locking member in the locked position.

67. The tag of [claim 65] *claim 66* wherein the first locking member defines an elongated slot and an opening in communication therewith; wherein the post is disposed in the slot in the locked position and is disposed in the opening in the unlocked position; and wherein the post engages the first locking member when in the slot and does not engage the first locking member when in the opening.

68. A theft deterrent tag adapted to be locked to an item of merchandise; the theft deterrent tag comprising:

a first tag element carrying a first locking member;

a second tag element carrying a second locking member;

the second tag element being lockable to the first tag element by engaging the second locking member with the first locking member;

the first locking member including opposed teeth that define a slot there between; the second locking member including a portion that is disposed in the slot between the teeth when the first locking member is in a locked position; and the first locking member being movable from the locked position to an unlocked position to allow the second locking member to be released from the first locking member without spreading the opposed teeth away from each other.

69. The tag of claim 68 wherein the slot has an elongated direction; and wherein the first locking member is slidably movable in the elongated direction of the slot from the locked position to the unlocked position.

70. A theft deterrent tag adapted to be locked to an item of merchandise; the theft deterrent tag comprising:

a first tag element carrying a one-piece first locking member;

a second tag element carrying a second locking member;

the second tag element being lockable to the first tag element by engaging the second locking member with the first locking member;

the first locking member including opposed teeth that define a slot there between; the second locking member including a portion that is disposed in the slot between the teeth when the first locking member is in a locked position wherein removal of the portion of the second locking member from the first locking member is prevented by engagement of the portion by each of the opposed teeth; and the first locking member being movable only in a single linear direction from the locked position to an unlocked position wherein the second locking member is removable from the first locking member.

71. The tag of claim 70 wherein the first locking member is slidably movable in the single linear direction.

72. The tag of claim 71 wherein the first locking member slidably engages a pair of elongated spaced ribs.

73. The tag of claim 70 wherein the slot is elongated in the single linear direction.

74. A theft deterrent tag adapted to be locked to an item of merchandise, the theft deterrent tag comprising:

a first tag element carrying a one-piece first locking member;

a second tag element carrying a second locking member;

a second tag element being lockable to the first tag element by engaging the second locking member with the first locking member;

the first locking member including opposed teeth that define a slot there between; the second locking member including a portion that is disposed in the slot between the teeth when the first locking member is in a locked position wherein removal of the portion of the second locking member from the first locking member is prevented by engagement of the portion by each of the opposed teeth; and the first locking member being non-pivotably and non-flexingly moveable from the locked position to the unlocked position wherein the second locking member is removable from the first locking member.

75. The tag of claim 74 wherein the second locking member is removable from the first locking member without flexing the first locking member.

*76. The tag of claim 1 wherein the first locking member defines a slot having an elongated direction; wherein a portion of the second locking member is disposed in the slot when the first locking member is in the locked position; and wherein the first locking member is linearly slidable in the elongated direction of the slot from the locked position to the unlocked position.*

*77. The tag of claim 76 wherein the movement of the first locking member from the locked position to the unlocked position moves the first locking member out of contact with the second locking member so that the second locking member is removable from the first tag element.*

*78. The tag of claim 1 wherein a key prong is insertable into the tag to move the first locking member to unlock the first tag element from the second tag element.*

*79. The tag of claim 78 wherein the first tag element includes a seal that must be punctured to allow the key to be inserted into the tag.*

*80. The tag of claim 78 wherein the key prong directly contacts the first locking member to slide the first locking member from the locked to the unlocked position.*

*81. The tag of claim 9 wherein the opposed ribs are elongated and spaced from one another to define a portion of an opening sized to receive a key prong that moves the first locking member from the locked position to the unlocked position.*

*82. The tag of claim 81 wherein the key prong moves the first locking member from the locked position to the unlocked position without engaging the ribs of the first tag element.*

*83. The tag of claim 9 wherein the opposed ribs are elongated; wherein the first locking member defines an elongated slot in which a portion of the second locking member is disposed in the locked position; and wherein the elongated ribs of the first tag element are elongated in the elongated direction of the slot.*

*84. The tag of claim 9 wherein the first locking member defines an elongated slot in which a portion of the second locking member is disposed in the locked position; and wherein a key prong is insertable into the tag and movable in the elongated direction of the slot to move the first locking member from the locked position to the unlocked position.*

*85. The tag of claim 12 wherein the first locking member is movable from the locked position to the unlocked position without spreading the opposed teeth away from each other.*

*86. The tag of claim 13 wherein the first tag element includes a stop which the first locking member abuts in the locked position to align the opening with the portion of the second locking member.*

*87. The tag of claim 13 wherein the opening in the first locking member is wider than the slot.*

*88. The tag of claim 13 wherein the portion of the second locking member is offset from the opening when the first locking member is in the locked position.*

* * * * *